Sept. 15, 1959   S. L. CHRISTIE ET AL   2,904,748
APPARATUS FOR TESTING STORAGE BATTERIES
Filed Dec. 1, 1955
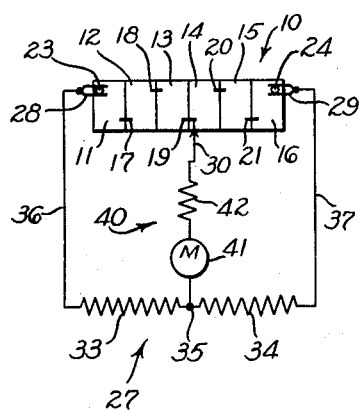
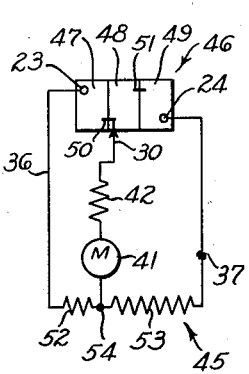
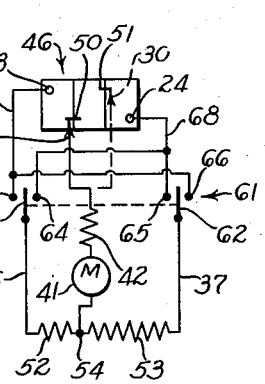
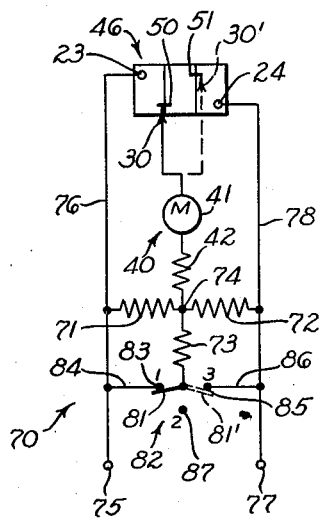
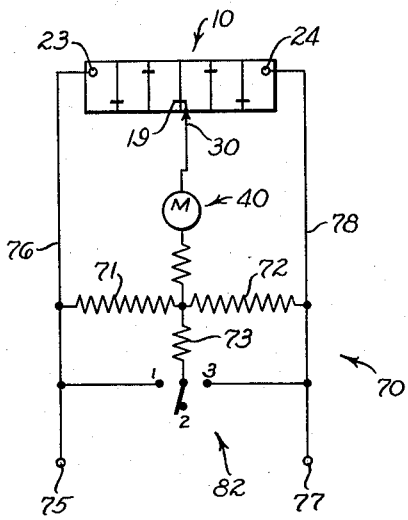
INVENTORS.
SOREN L. CHRISTIE
FRANK C. MARSHALL
BY THEIR ATTORNEYS.
HARRIS, KIECH, FOSTER & HARRIS United States Patent Office 2,904,748
Patented Sept. 15, 1959

2,904,748
APPARATUS FOR TESTING STORAGE BATTERIES

Soren L. Christie and Frank C. Marshall, Los Angeles, Calif., assignors to Christie Electric Corp., a corporation of California Application December 1, 1955, Serial No. 550,312

3 Claims. (Cl. 324—29.5)

This invention relates to apparatus for testing multiple cell batteries.

In present-day multiple cell storage batteries, such as the 6, 12 and 24 volt lead-acid batteries used in automobiles and aircraft, it is often desirable to be able to carry out quick and simple checks on the condition of the battery. A measurement of the terminal voltage of the battery, either with or without a load attached thereto, is not satisfactory since the battery voltage varies as a function of such conditions as temperature, state of charge, type of cells and age, and therefore the terminal voltage cannot be relied upon as a true indication of the condition of the battery.

One known method of testing the condition of a multiple cell battery is to measure the voltage of each individual cell with or without a load, and compare the readings obtained. If carried out manually, the possibility of errors, due to the human element is always present and the operation is slow and cumbersome, particularly with respect to 12 and 24 volt batteries. Apparatus has been provided for automatically measuring and comparing the voltages of each cell. Such equipment is complicated and expensive and of course requires connections to each of the junctions between the cells of the battery.

It is an object of this invention to provide simple, rapid and inexpensive apparatus for testing multiple cell batteries. Another object of the invention is to provide apparatus for testing which may be adapted for use with batteries having any number of cells, either odd or even.

It is another object of the invention to provide an apparatus for testing a battery having three cells or three equal groups of cells in which a weak cell or group of cells may be identified by performing two simple and rapid measurements.

It is a further object of the invention to provide a single piece of equipment which can be used in testing both batteries having an odd number of cells and batteries having an even number of cells, such as the conventional 6 and 12 volt batteries used in present-day automobiles.

The invention also comprises novel details of construction and novel combinations and arrangements of parts, which will more fully appear in the course of the following description. The drawings merely show and the description merely describes preferred embodiments of the present invention, which are given by way of illustration or example.

In testing a battery having a plurality of cells, a load is connected across the battery and a voltage detector is connected between the junction of two of the cells of the battery and the junction of two serially connected resistors comprising the load. The ratio of the resistances of the two resistors comprising the load is made the same as the ratio of the rated voltages of the corresponding groups of cells on each side of the junction to which the voltage detector is connected. If each of the cells in the battery is developing its rated voltage, or if each is developing the same percentage of its rated voltage in case of some variation in the battery condition due to temperature, state of charge, age, or the like, no voltage difference will exist at the junctions to which the voltage detector is connected. However, if one of the cells is not developing the proper voltage, a voltage difference will exist between these junctions.

In the drawings, which are schematic representations of apparatus embodying the teachings of the invention:

Fig. 1 shows an embodiment of the invention adapted for use with a battery having an even number of cells;

Fig. 2 shows an embodiment of the invention adapted for use with a battery having an odd number of cells;

Fig. 3 shows an alternative embodiment of the apparatus of Fig. 2;

Fig. 4 shows an apparatus adapted for use with batteries having an odd number of cells and with batteries having an even number of cells, the apparatus being coupled to a battery in the former category; and Fig. 5 shows the apparatus of Fig. 4 connected to a battery in the latter category.

In Fig. 1, a battery 10 composed of a plurality of identical cells 11, 12, 13, 14, 15 and 16 serially connected at junctions 17, 18, 19, 20 and 21, has output terminals 23 and 24. A testing apparatus 27 is connected to the battery 10 by means of terminal clamps 28 and 29 attached to the terminals 23 and 24 respectively and to a test prod 30 which may be manually brought into contact with any of the junctions interconnecting the cells of the battery. A load consisting of resistors 33 and 34 serially connected at the junction 35 is connected to the terminal clamps 28 and 29 by leads 36 and 37 respectively. A voltage detector 40, which in the embodiment of Fig. 1 consists of a current meter 41 serially connected with a resistor 42, is connected between the junction point 35 and the test prod 30.

In the testing apparatus as shown in Fig. 1, the resistances of the resistors 33 and 34 are made the same, in which event the test prod 30 should be connected to the mid-point junction 19. If each of the cells of the battery 10 is in good condition, all of the cells will produce equal voltages under the load applied and no voltage difference will exist between the junction 19 and the junction 35. However, if one of the cells is weak, its voltage will be less than that of each of the other cells and a voltage difference will exist between the junctions 19 and 35. For example, if the terminal 23 is positive and the terminal 24 is negative and cell 11 is the weak cell, terminal 19 will be positive with respect to terminal 35 and the voltage detector will so indicate. The polarity of the indication on the meter 41 will point out which of the groups of cells 11, 12 and 13 or 14, 15 and 16, contains the weak cell. The meter may be calibrated to indicate the degree of deviation from normal of the weak cell, if desired.

The ratio of the resistances of the resistors 33 and 34 may be varied to correspond with batteries having different numbers of cells and with the particular cell junction to which the test prod 30 is applied. In Fig. 2, a testing apparatus 45, similar to the testing apparatus 27 of Fig. 1, is shown being applied to a battery 46 having three cells 47, 48 and 49 serially connected by junctions 50 and 51. The load of the testing apparatus 45 consists of resistors 52 and 53 serially connected at the junction 54. The other elements of the testing apparatus 45 are identical with those of the testing apparatus 27.

The ratio of the resistance of the resistor 53 to the resistance of the resistor 52 is made 2 to 1. When the leads 36 and 37 are connected to the terminals 23 and 24 respectively and the test prod is applied to the junction 50, there will be no voltage between the junctions 50 and 54 if the cells 47, 48 and 49 develop identical voltages, since the ratio of the rated voltage of the serially connected cells 48 and 49 to the rated voltage of cell 47 is the same as the ratio of the resistance of the resistor 53 to the resistance of the resistor 52.

If it is assumed that the cell 48 is weak, the meter will indicate that there is a weak cell in the group consisting of the serially connected cells 48 and 49. By making a second measurement with the testing apparatus of Fig. 2, it is possible to determine that it is the cell 48 and not the cell 49 which is weak. In making the second measurement, the lead 37 is connected to the terminal 23, the lead 36 is connected to the terminal 24 and the test prod 30 is applied to the junction 51. Under these conditions, the meter will indicate that the weak cell is one of the group consisting of the serially connected cells 47 and 48. Knowing that cell 47 was previously indicated as being normal, it can now be concluded that cell 48 is the weak cell in the battery.

If, in a three cell battery having one weak cell, the weak cell is in the group consisting of two cells, the voltage between the junctions to which the detector is attached will be one-half that when the weak cell is in the group consisting of one cell. If a specific criterion for an acceptable battery is established, it is possible to provide a "good-bad" type of indication by making the ratio of the resistances slightly greater than 2 to 1. The particular ratio depends upon the criterion established for the battery. Under this condition, when all three cells are good, the device will indicate that the group comprising two cells is weak but not weak enough to be considered bad. If one of the two cells is actually bad, the device will produce a greater indication of the same sense. If the single cell comprising the other group is bad, the device will also produce a "bad" indication, and if the voltage detector indicates polarity, of the opposite sense.

The testing apparatus 45 of Fig. 2 may be used to check the condition of a battery having an even number of cells, such as the six cell battery 10 of Fig. 1. In carrying out such a test, the apparatus 45 of Fig. 2 would be connected to the battery 10 of Fig. 1 in the same manner as the testing apparatus 27 is connected in Fig. 1 with the exception of the test prod 30 which would now be applied to the junction 18. The ratio of the resistance of the resistor 53 to the resistance of the resistor 52 is the same as the ratio of the rated voltage of a group of cells 13, 14, 15 and 16 to the rated voltage of the group of cells 11 and 12. Therefore no voltage would be established between the junctions 18 and 35 if all of the cells of the battery 10 are in the same condition. However if one of the cells is weak, there will be a voltage between the junctions 18 and 35 which the voltage detector would indicate.

An alternative embodiment of the apparatus of Fig. 2 is shown in Fig. 3, wherein the lead 36 is connected to an arm 60 of a double pole double throw switch 61 and the lead 37 is connected to the other arm 62 of the switch 61. Fixed contacts 63 and 66 of the switch 61 are connected to the terminal 23 by a lead 67 and fixed contacts 64 and 65 are connected to the terminal 24 by a lead 68. When the switch 61 is thrown to the left position as seen in Fig. 3 and the test prod 30 is at the junction 50, the operation of the apparatus shown in Fig. 3 is identical to that of the apparatus shown in Fig. 2. When the switch 61 is thrown to the right and the test prod is applied to the junction 51 as shown by the dashed line and numeral 30', the leads 36 and 37 are now connected to the terminals 24 and 23 respectively and the operator of the apparatus can determine which of the three cells is the weak one in the same manner as was described in conjunction with the apparatus of Fig. 2. Thus by use of the switch 61, it is possible to make two different measurements on a battery without disconnecting and reconnecting the leads at the terminals of the battery, providing a rapid and simple means for making a complete test of the battery.

A testing apparatus 70 which combines the features of the embodiments of Figs. 1, 2 and 3, is shown in Figs. 4 and 5, the apparatus being connected to the three-cell battery 46 in Fig. 4 and to the six-cell battery 10 in Fig. 5. In the testing apparatus 70, three resistors 71, 72 and 73, of equal resistance value, have one end of each connected to a junction 74, the voltage detector 40 being connected between the junction 74 and the test prod 30. The other end of the resistor 71 is connected to the battery terminal 23 and to a charger terminal 75 by a lead 76 and the other end of the resistor 72 is connected to the battery terminal 24 and to a charger terminal 77 by lead 78. The other end of the resistor 73 is connected to the moving arm 81 of a three position switch 82, the switch positions being indicated by the numerals 1, 2 and 3. A fixed contact 83, corresponding to the position 1 of the switch, is connected to the lead 76 by a lead 84, another fixed contact 85, corresponding to the switch position 3, is connected to the lead 78 by a lead 86, and a third fixed contact 87, corresponding to the switch position 2, is not connected into the circuit.

With the leads 76 and 78 connected to the terminals 23 and 24 respectively, the test prod 30 contacting the junction 50 and the switch 82 in the number 1 position, the operation of the testing apparatus 70 of Fig. 4 is identical with that of the testing apparatus 45 of Fig. 2, the ratio of the resistance of the resistor 72 to the resistance of the parallel connected resistors 71 and 73 being 2 to 1.

Switch 82 may be moved to the third position as indicated by the numeral 81', and the test prod 30 may be moved to the junction 51, as indicated by the numeral 30', to provide the same two-step testing procedure which the embodiment of Fig. 3 provides. When it is desired to apply the test prod 30 to the middle junction of a multiple cell battery, thereby separating the battery into two groups having equal numbers of cells therein, the switch 82 is moved to the second position, effectively removing the resistor 73 from the load circuit. In Fig. 5 the testing apparatus 70 is shown applied to the battery 10 with the test prod 30 contacting the junction 19 and with the switch 82 in the number 2 position, thereby permitting the testing apparatus to be used in the same manner as the apparatus shown in Fig. 1.

The testing apparatus 70 of Figs. 4 and 5 is provided with terminals 75 and 77 for connection with the output terminals of a battery charger. This permits the apparatus to be built into or permanently attached to a battery charger providing for rapid and easy performance of all battery servicing. When a battery is being charged using the apparatus as described, the switch 82 would normally be in the number 2 position and the test prod 30 would not be contacting any of the junctions of the battery. The resistance of the resistors 71 and 72 may be made such that very little power would be consumed therein when the charger is in operation.

It has been stated above that the resistances of the various resistors which comprise the loads of the testing apparatuses described, bear certain relations to each other. It should be noted that it is not essential to the practice of the invention for these resistances to have the exact relations set out; however, the accuracy of the tests performed will be a function of the accuracy with which the various resistance relationships are carried out in the testing apparatuses as constructed. Hence in the performance of the methods and in the construction of the apparatus described herein, it is preferable that the resistance relationships be maintained as exact as possible.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a testing apparatus for a battery having a plurality of serially connected cells, and first and second terminals, using the battery as the sole source of power, the combination of: a load comprising a pair of serially connected resistors having a common junction, said load having first and second terminals; switch means for sequentially connecting said first and second load terminals to said first and second battery terminals, respectively, and to said second and first battery terminals, respectively; means for detecting a voltage difference between said common junction and the junction of two of the cells of the battery.

2. In a battery testing apparatus for a battery having a plurality of serially connected cells, and using the battery as the sole source of power, the combination of: a load comprising two serially connected resistors of substantially equal resistance and having a common junction, said load having first and second terminals; means for connecting said first and second load terminals to the respective terminals of the battery; a third resistor having a resistance substantially equal to that of each of said resistors comprising said load; means connecting one end of said third resistor to said common junction; means for sequentially connecting the other end of said third resistor to said first load terminal, to said second load terminal and to neither of said load terminals; and means for detecting a voltage difference between said common junction and the junction of two of the cells of the battery.

3. A testing apparatus as defined in claim 2 including means for coupling the output terminals of a battery charger to said first and second load terminals respectively.

References Cited in the file of this patent

UNITED STATES PATENTS

| | | |
|---|---|---|
| 2,254,846 | Heyer | Sept. 2, 1941 |
| 2,267,826 | Heyer | Dec. 30, 1941 |
| 2,613,248 | Christie | Oct. 7, 1952 |
| 2,621,231 | Medlar et al. | Dec. 9, 1952 |
| 2,644,132 | Christie et al. | June 30, 1953 |

FOREIGN PATENTS

| | | |
|---|---|---|
| 898,489 | France | July 3, 1944 |